United States Patent

[11] 3,586,090

[72] Inventor George L. Henderson
Seattle, Wash.
[21] Appl. No. 780,498
[22] Filed Dec. 2, 1968
[45] Patented June 22, 1971
[73] Assignees Joseph B. Ward;
Calvin B. Lake; M. T. Riback; George
Henderson; F. V. Lockman, , part interest
to each
Continuation of application Ser. No.
532,036, Jan. 27, 1966, now Patent No.
3,414,483, which is a continuation-in-part
of application Ser. No. 233,608, Oct. 29,
1962, now abandoned.

[54] METHOD FOR EVAPORATING BRINE
10 Claims, 19 Drawing Figs.
[52] U.S. Cl. ................................................ 159/49,
159/28, 159/45, 159/13, 203/26, 203/48, 23/296
[51] Int. Cl. ........................................... B01d 1/22,
B01d 1/00
[50] Field of Search .......................................... 159/13 A,
13 B, 2 MS, 28, 48, 45, 13, 47, 49, 17, 17 VS;
202/173, 182, 236; 203/7, 10, 11, 24, 88, 89, 91,
26, 48; 23/273, 296

[56] References Cited
UNITED STATES PATENTS
| | | | |
|---|---|---|---|
| 2,510,233 | 6/1950 | Kermer | 159/3 |
| 3,219,552 | 11/1965 | Starmer et al. | 203/88 X |
| 3,248,181 | 4/1966 | Akimoto | 23/300 |
| 2,782,097 | 2/1957 | Gostolow | 23/273 LX |
| 3,218,241 | 11/1965 | Checkovich | 203/11 X |
| 3,119,752 | 1/1964 | Checkovich | 203/11 |

FOREIGN PATENTS
748,572  5/1956  Great Britain ................  159/47

Primary Examiner—Norman Yudkoff
Assistant Examiner—Jack Sofer
Attorney—Dressler, Goldsmith, Clement & Gordon ABSTRACT: A method is provided for evaporating brines, such as sea water, in a system in which the brine is transferred to successive evaporating zones wherein blocking of the transfer lines is avoided. Specifically, the amount of precipitation is limited to avoid slurry viscosities in excess of 150 centipoise and the velocity of the transferring slurry is maintained high enough to keep the slurry particles in suspension.

In one specific embodiment, the brine is first treated under atmospheric pressure to evaporate a portion of the liquid therein and to precipitate a substantial amount of solid. The brine is then transferred at its atmospheric boiling point to a reduced pressure flashing zone to evaporate additional liquid while precipitating additional dissolved solid.

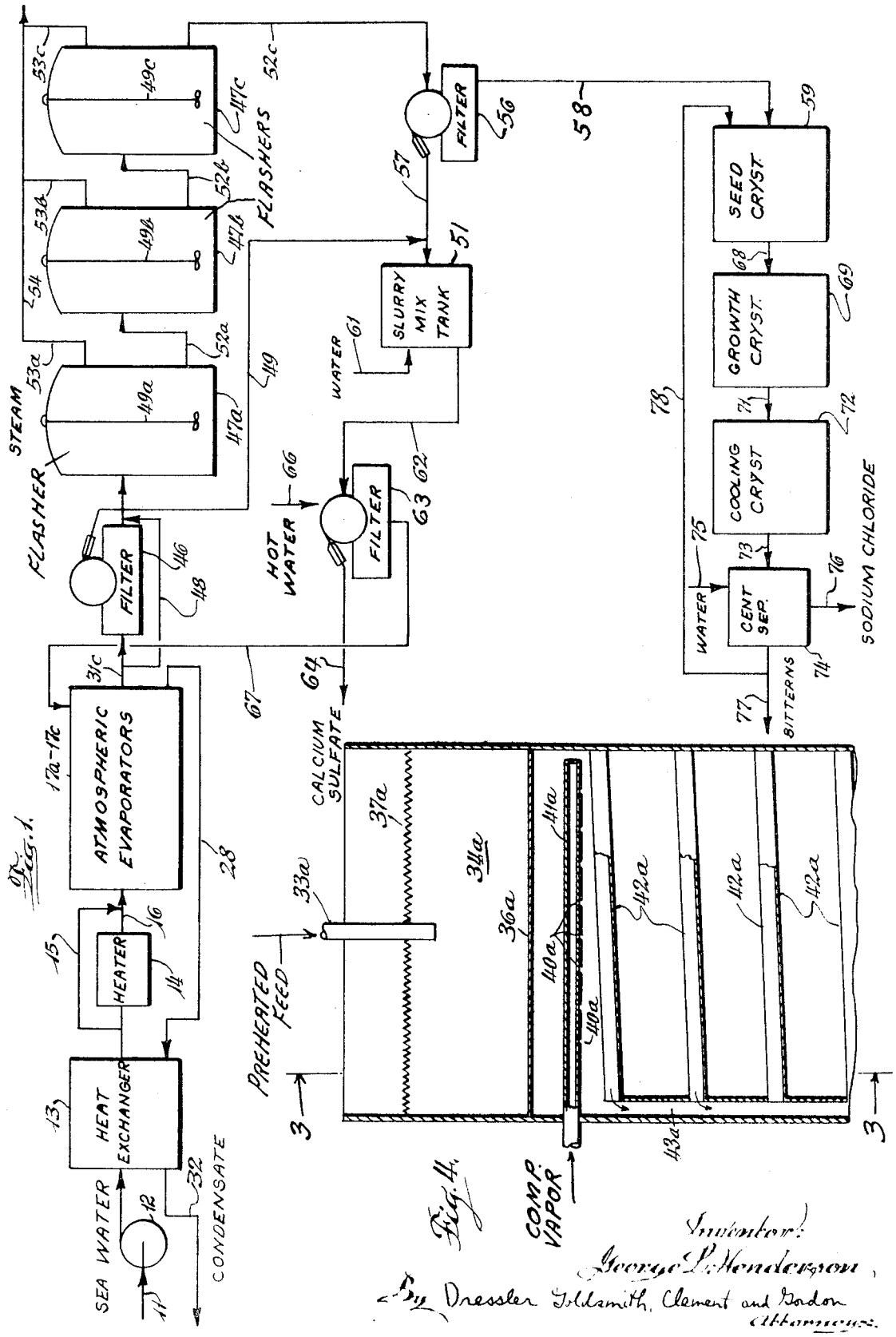

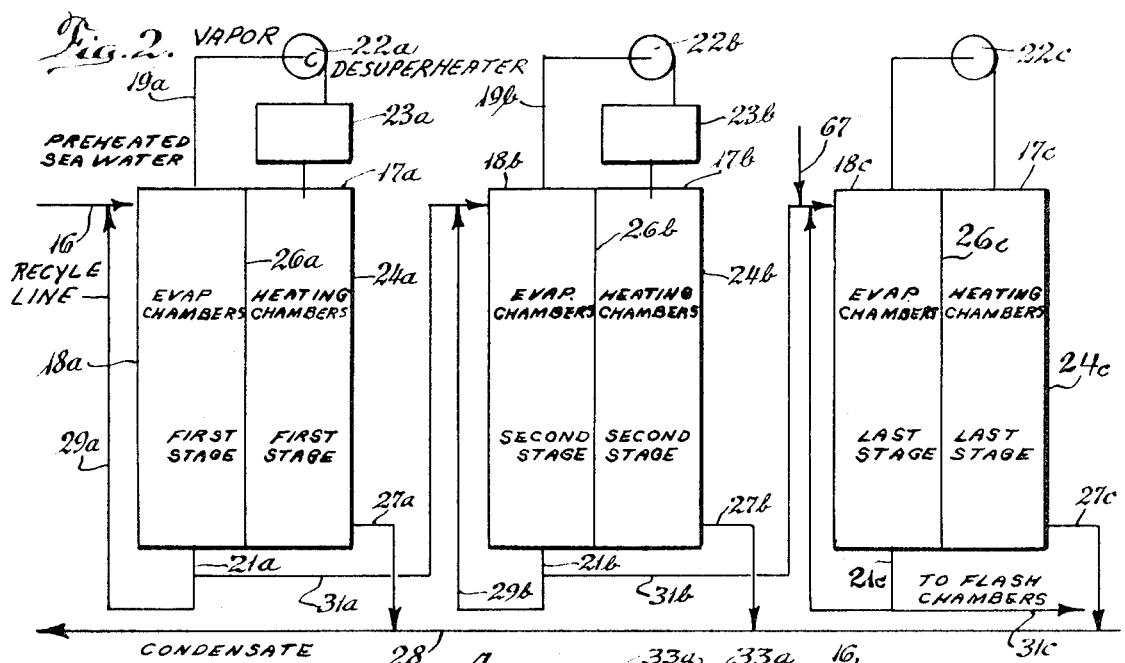
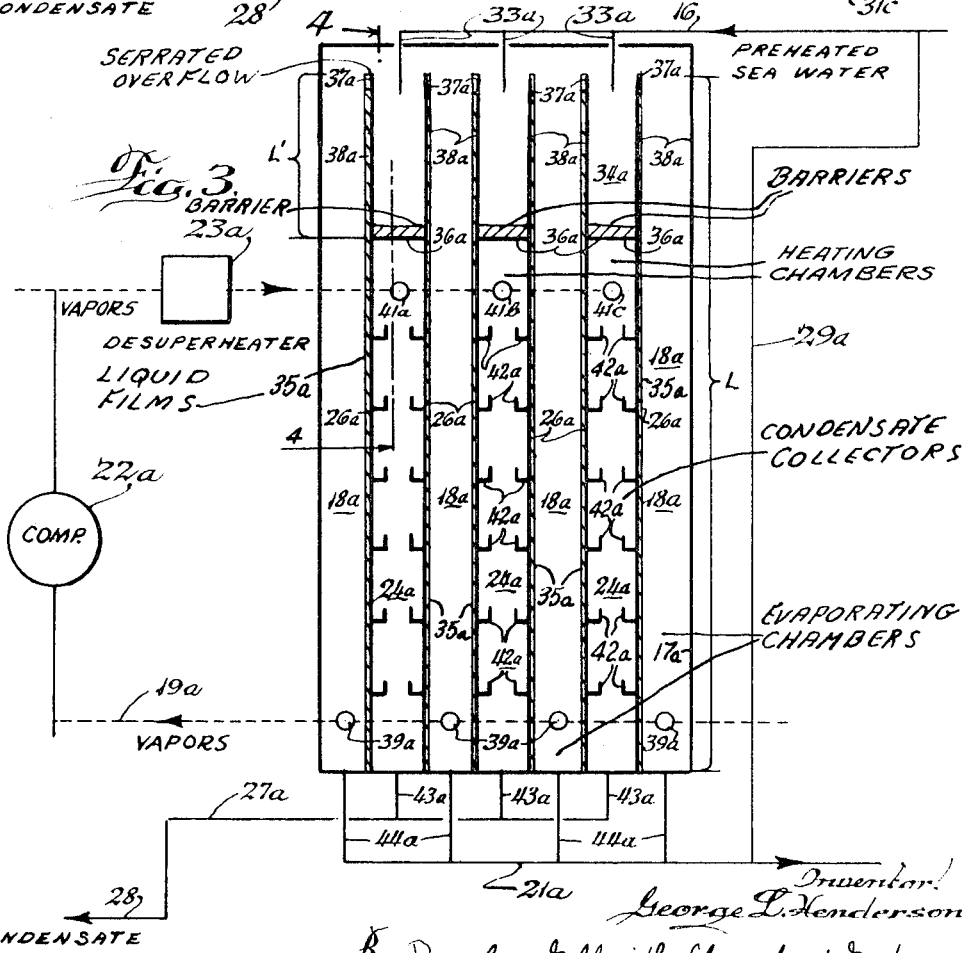

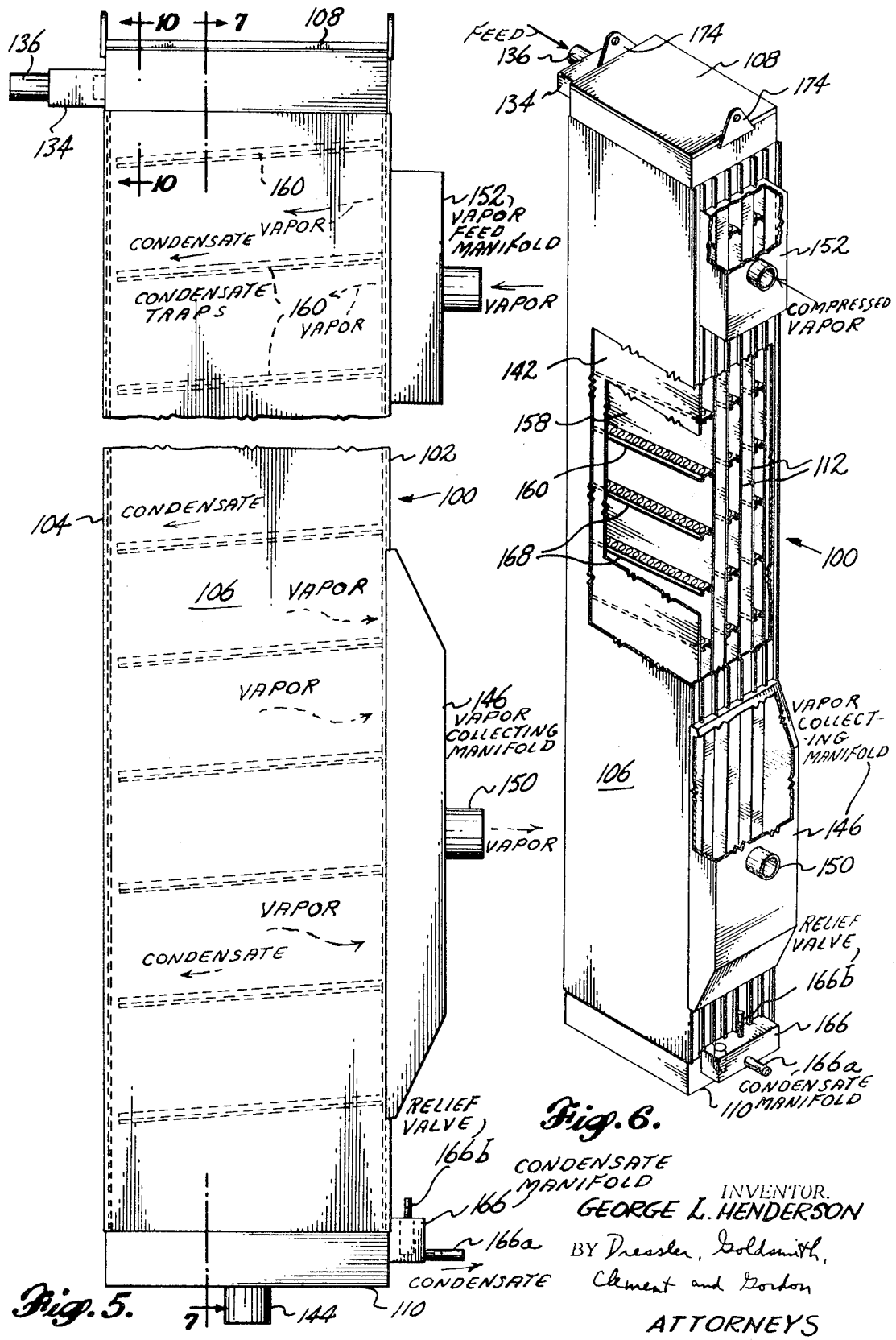

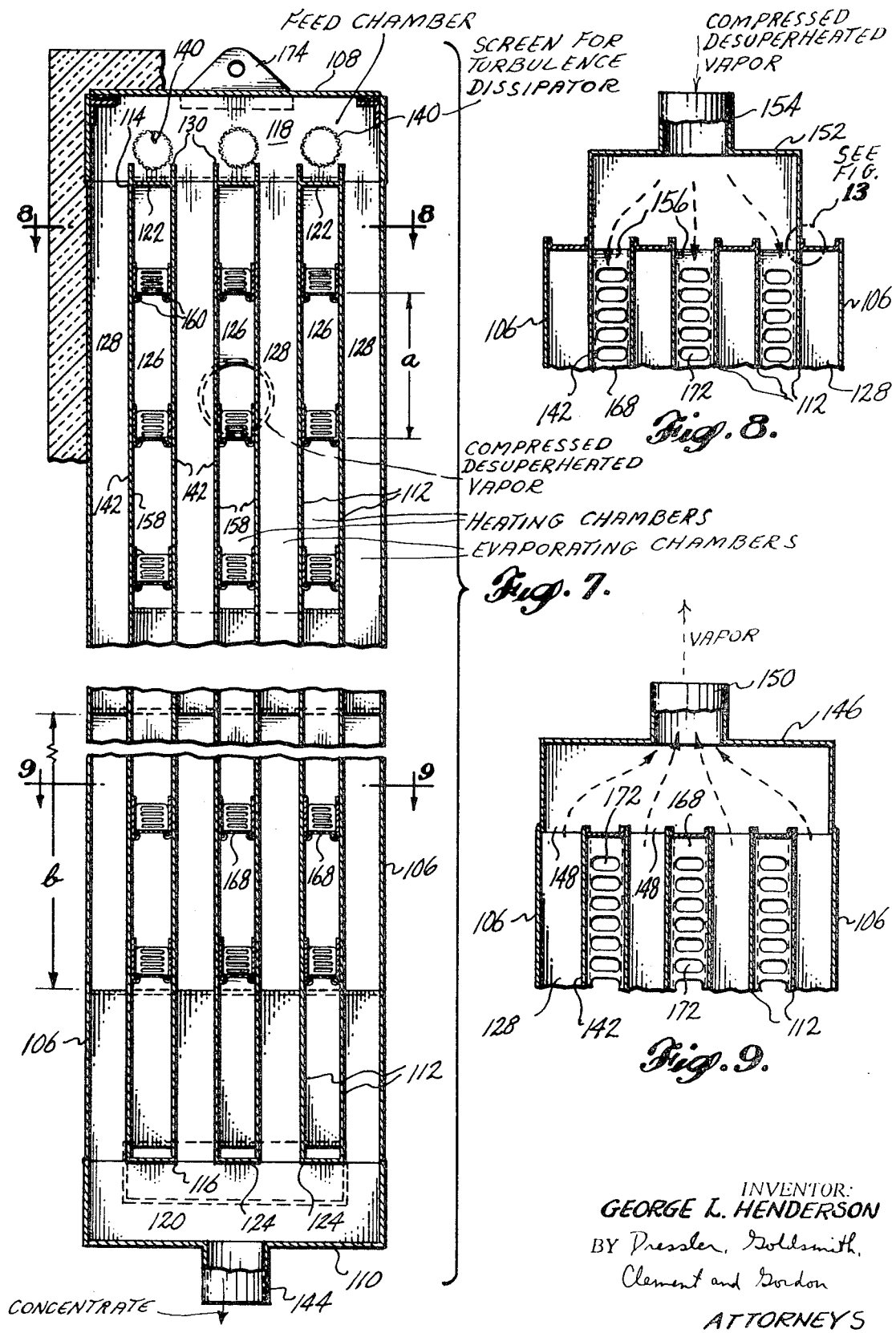

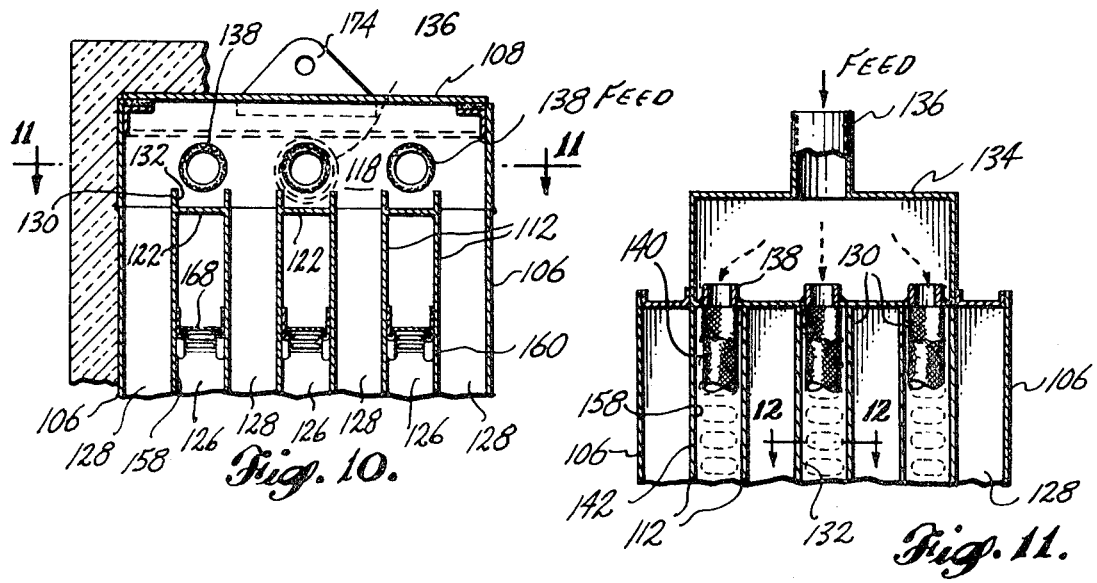
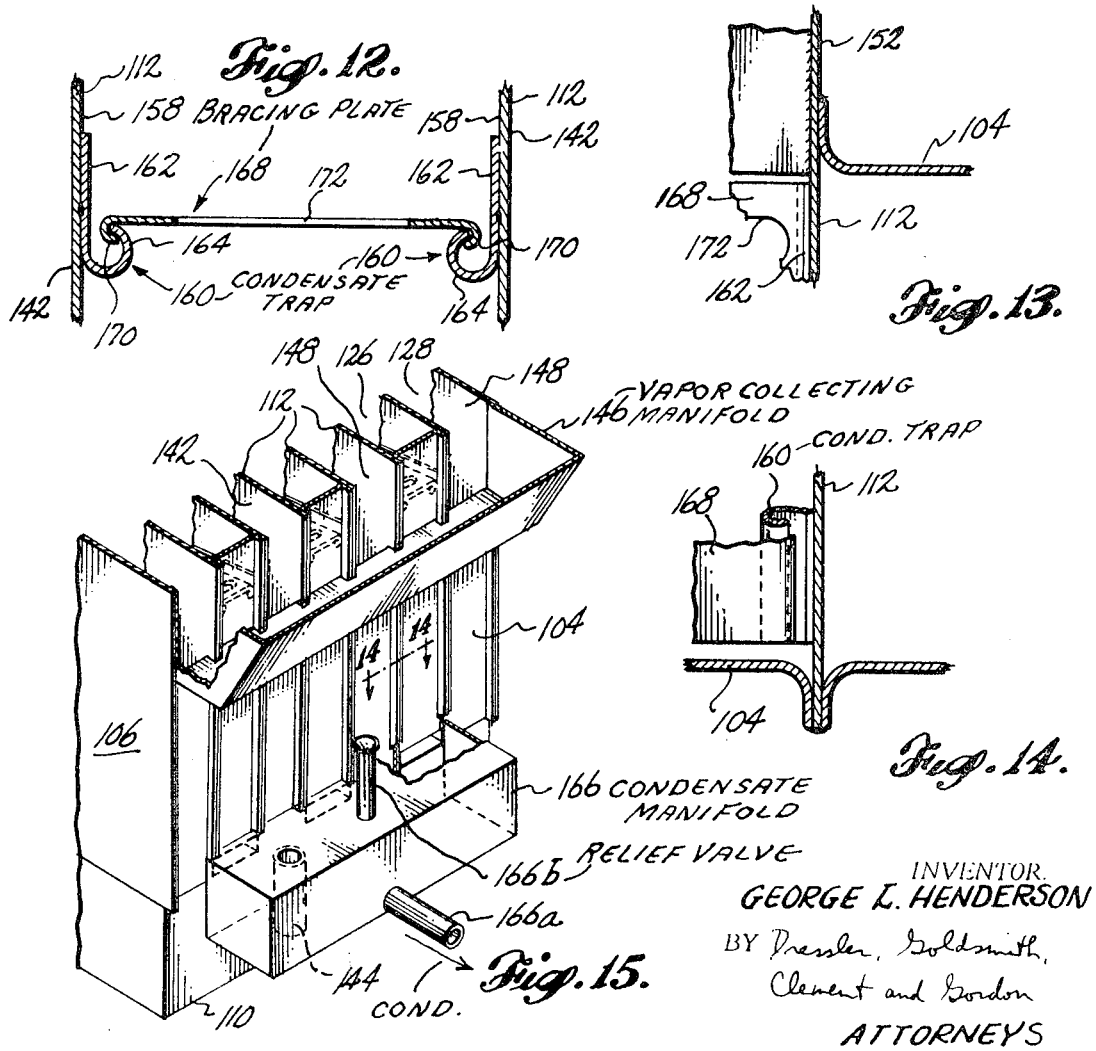

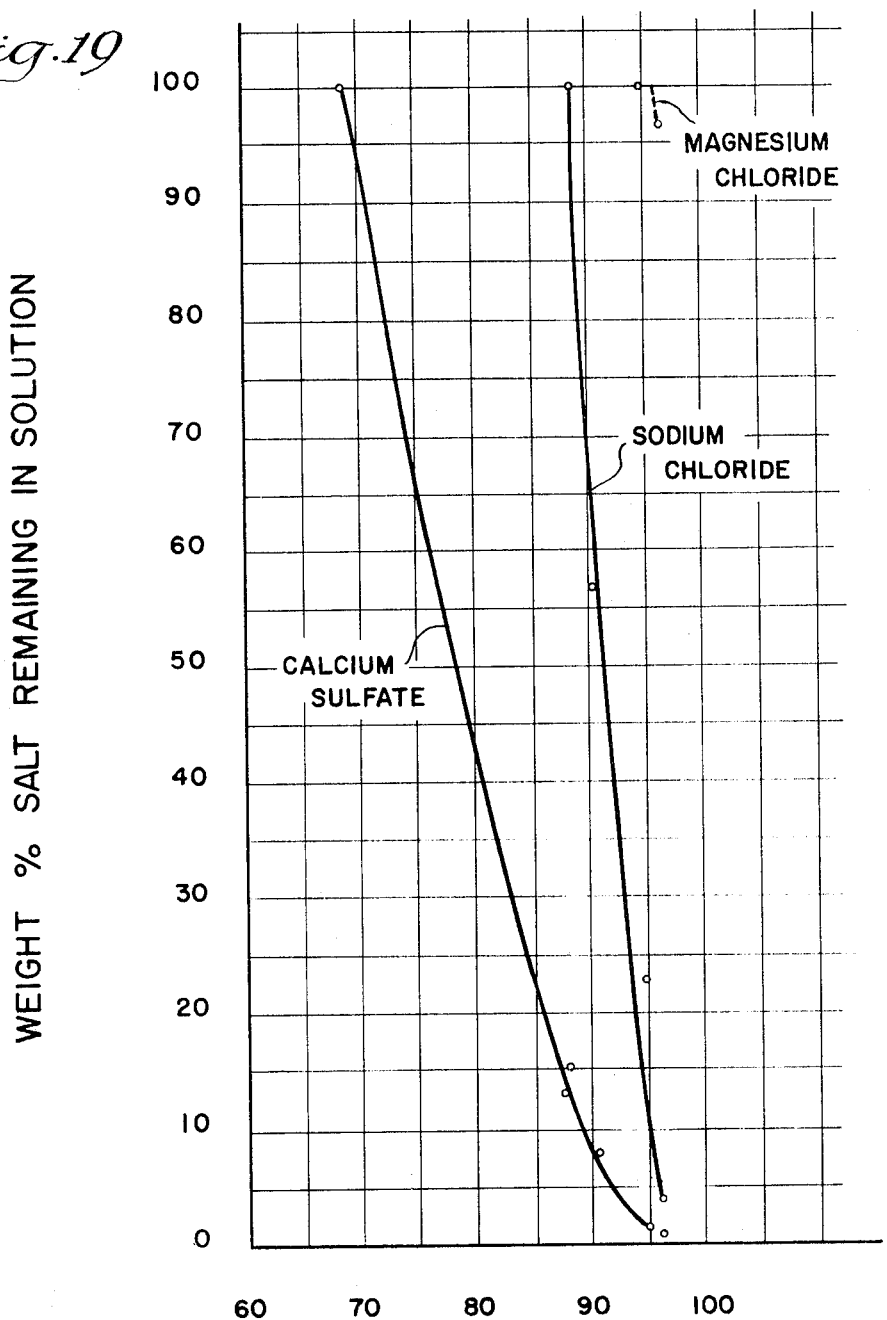

METHOD FOR EVAPORATING BRINE

This is a continuation in part of my copending U.S. Pat. application entitled, "Selected Film Velocity Distillation," Ser. No. 532,036, filed Jan. 27, 1966, now U.S. Pat. No. 3,414,483, which in turn, is a continuation in part of copending U.S. application entitled "Apparatus and Method for Evaporating Brine," Ser. No. 233,608, filed Oct. 29, 1962, now abandoned.

This invention relates to the evaporation of liquids and more particularly to a process and an apparatus for the evaporation of aqueous solutions of solid materials, such as brines.

Common salt, sodium chloride, is a low-cost material in many areas. In other areas, freight costs add to its price as much as or more than the original cost of the material itself. In such areas, there is sometimes available a brine, such as sea water, which might be evaporated, but in general evaporation costs have bee prohibitive.

In some seacoast areas where sunny climates exist it has been possible to effect solar evaporation economically but solar evaporation requires substantial amounts of available land and rising land costs have made solar evaporation uneconomical in areas which might otherwise be quite suitable for it. In addition, solar evaporation generally produces no usable condensate and therefore provides no readily available washing medium and permits only partial purification of the sodium chloride from other dissolved salts.

Many schemes for the evaporation of sea water have been proposed, both for the recovery of its salt content and for the recovery of its water. Of these schemes, those involving vapor compression systems are among the most economical. In a vapor compression system, the vapors evaporated from the brine are heated to a higher temperature by substantially adiabatic compression and used at the higher temperature as a source of heat for the evaporation of additional brine. In essence, such processes use compression work rather than direct addition of heat to supply the external energy required for evaporation.

While many evaporation systems of this or of a somewhat similar nature are operable, and do serve useful functions in some situations, there are problems in attempting to employ them more generally in commercial operations. With a good number of systems, the efficiencies are simply too low with the result that unless abundant power can be made available at a very low cost, the system is simply not economically feasible. In other cases where a system has been so devised as to obtain better efficiency, other difficulties have offset that advantage. For example, some of these systems utilize apparatus which requires a capital outlay that is prohibitive in terms of the expected output of the system. And sometimes the operation of the system is such that the maintenance becomes too costly in that it requires frequent replacement of parts and/or servicing of the equipment, possibly along with frequent shutdowns of the system to perform the maintenance thereof.

In evaporation systems wherein the liquid being evaporated is heated by indirect heat exchange with a heating fluid, it is the general practice to maintain a relatively high temperature differential between the two fluids in order to get maximum utilization of the heating surface of the heat transfer wall. Achievement of this goal, however, is more illusory than real since high temperature differentials result in uneven heating and in the development of hot spots on the heat transfer surface. This, in turn, results in the deposition of salts on the heat transfer surface with consequent impairment of heat transfer through the wall, thus defeating the very purpose for which the high temperature differential was adopted.

In accordance with one embodiment of this invention, there is provided a method for evaporating a brine which comprises passing said brine downwardly as a flowing film over a heat transfer wall, passing a heated fluid into contact with the opposite side of said heat transfer wall at a temperature no greater than about 15 F. above the temperature of said flowing film, and imparting a downward velocity on said film at the upper heat transfer level of the heat transfer wall at least equivalent to the velocity achieved by a free-falling film of said brine on a smooth vertical wall after a fall of about 3 feet.

It has been found that despite the relatively low-temperature differential maintained in this method, the heat transfer is high because of its efficiency. The low-temperature differential prevents the formation of local hot spots on the heat transfer walls and the high velocity of the flowing film enhances heat transfer thereto. Heat transfer to a film in turbulent flow is proportional to the velocity to the 0.08 power.

In addition, the high film velocity prevents the adherence of any precipitated salt to the heat transfer surface and instead keeps such precipitates suspended in the liquid, thereby avoiding fouling of the heat transfer surface.

In accordance with a second embodiment of this invention, there is provided an apparatus which has been found to be especially effective in evaporating the brine in the initial stages of the overall evaporative process at which stages the salt content of the brine is not excessively high. This apparatus is made up of components, most of which can be supplied quite economically and which can be constructed into an operating system with relative ease. The mode of operation of the apparatus is such that it does not require more sophisticated equipment seen in many prior art devices (e.g., high-performance equipment which may have many moving parts or which must be made to particularly high specifications since it is to be subjected to high temperatures and/or pressures or other demanding conditions). Concomitant with this is the fact that the problems of maintaining the apparatus in proper working order are simplified.

Yet it has been found that this apparatus, while having these various advantages, is able to function with high efficiency, not only in terms of relatively high heat transfer coefficients across its heat transfer surfaces, but also in terms of overall efficiency (i.e., power input per unit of fresh water recovered). This is in contrast to many of the prior art devices where to improve the performance of the system it has been necessary to incorporate more sophisticated devices, which unfortunately complicate the operation of the system and detract from its overall desirability for a commercial operation.

As a generalization, it may be said that in its preferred embodiment the present invention achieves its ends by creating in an especially effective manner a proper balance of the various factors which affect the efficiency of the system, as well as other practical aspects of the same. This balance has various facets. For instance, the various factors which affect heat transfer across the heat transfer surfaces are brought into proper relationship so that the overall heat transfer coefficient is high. Yet this is accomplished in such a manner that there is not imposed on the system burdens disproportionate to the benefits of achieving these high heat transfer coefficients. (For example, the power requirements, the circulating or recycling equipment, the structural material and other equipment are so arranged and so cooperate with one another that they are kept within practical limits.) In the field of desalinization especially, where the operability of many different systems has long been an accepted fact, but where the economic feasibility of most all of these systems remains as the paramount consideration, the importance of this balance throughout the system cannot be too greatly stressed.

In the present invention, it becomes practical, and in certain aspects quite desirable, to utilize vertically disposed heat transfer walls of a greater height than was heretofor practical. This, of course, makes it possible to obtain greater heat transfer surface without using more ground area and without a corresponding increase in circulating and/or recycling equipment and various structural components. There is the further positive benefit that this increased height enhances heat transfer on each wall surface down which the distilland falls by virtue of the fact that the turbulence of the distilland increases as its velocity increases. On the opposite side of each heat transfer wall, the heat transfer is maintained at a correspondingly high level by keeping the thickness of the condensate film within proper limits, this being very effectively accomplished by means of traps provided on the condensate surface at properly spaced vertical intervals.

Another facet of the present invention is that a vapor collecting manifold is provided at an especially advantageous location at the side edges of the heat exchange walls. The evaporating process is so controlled and this manifold is so arranged that it can withdraw the vapor directly from the vaporizing chambers which are defined by adjacent heat transfer walls, without resorting to a separate flashing or settling chamber from which vapor can be collected.

Further, with the evaporating system of the present invention, the construction of the evaporating apparatus in a preferred embodiment involves essentially the erection of a plurality of vertically disposed, parallel, moderately spaced heat transfer walls, arranged in a manner to create alternate evaporating and condensing chambers. Such an evaporating unit can be made essentially in the form of a relatively simple boxlike structure, with the component parts thus being able to be supplied economically and be easily erected.

My invention may be more readily understood by reference to the drawings of which:

FIG. 1 is a semischematic flow sheet showing the overall process of this invention FIG. 2 is a semischematic flow sheet showing the multistage atmospheric evaporation step of the overall process;

FIG. 3 is a semischematic cross-sectional view showing the structure of the apparatus used in a single stage of the atmospheric evaporation;

FIG. 4 is a cross-sectional view through plane 4–4 of FIG. 3;

FIG. 5 is a fragmentary side elevational view of an evaporating unit of a second embodiment of the present invention;

FIG. 6 is an isometric view of the apparatus of FIG. 5, with portions thereof being broken away;

FIG. 7 is a fragmentary sectional view taken on line 7–7 of FIG. 5;

FIG. 8 is a fragmentary horizontal sectional view taken on line 8–8 of FIG. 7;

FIG. 9 is a fragmentary horizontal sectional view taken on line 9–9 of FIG. 7;

FIG. 10 is a fragmentary vertical sectional view taken on line 10–10 of FIG. 5;

FIG. 11 is a fragmentary horizontal sectional view taken on line 11–11 of FIG. 10;

FIG. 12 is a sectional view, drawn to an enlarged scale and taken on line 12–12 of FIG. 11;

FIG. 13 is a view drawn to an enlarged scale and detailing generally that portion of the apparatus circled at 13 in FIG. 8;

FIG. 14 is a sectional view drawn to an enlarged scale and detailing that portion of the apparatus indicated at 14–14 of FIG. 15, and FIG. 15 is a fragmentary isometric view illustrating the lower front portion of the apparatus shown in FIG. 6;

FIG. 19 is a graph illustrating the precipitation characteristics of a typical sea water containing 40,000 parts by weight of water, 982 parts of sodium chloride, 44 parts of calcium sulfate and 129 parts of magnesium chloride.

Figure 16:
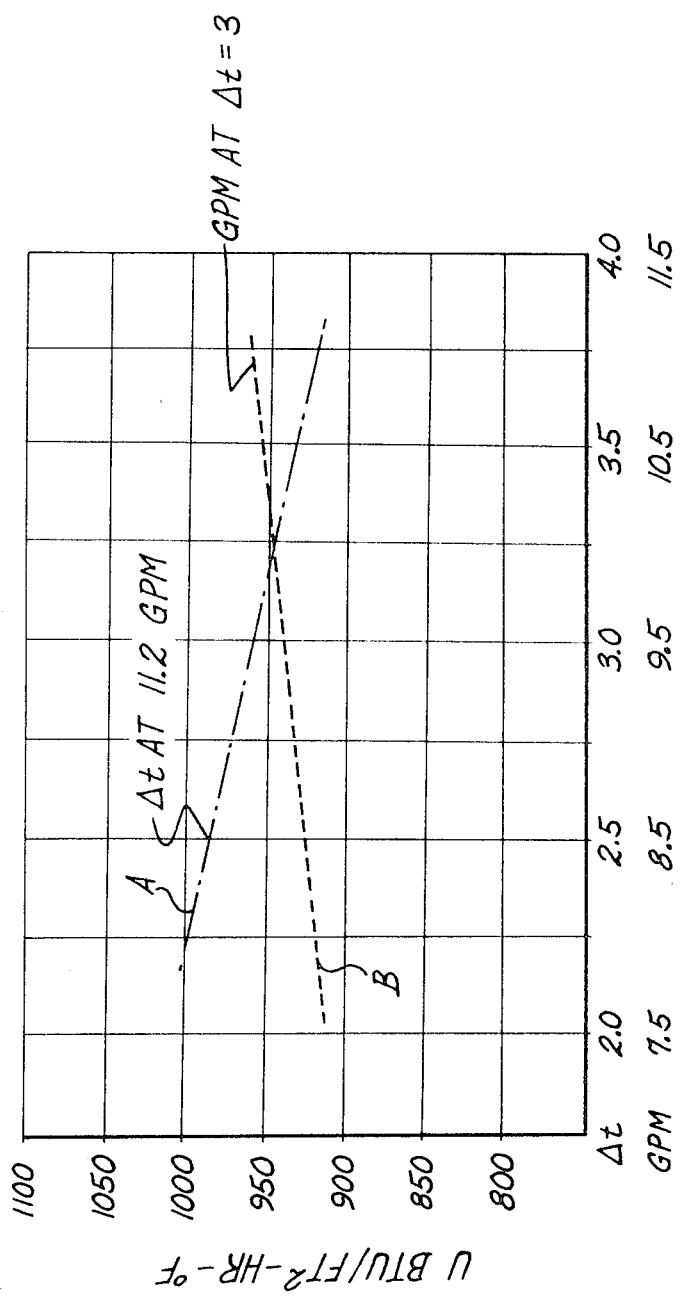
FIG. 16 is a first graph illustrating certain heat transfer characteristics of the present invention.

Referring specifically to FIGS. 1 and 2, sea water is drawn into the system through line 11, passes through pump 12 and into countercurrent heat exchanger 13 where it picks up heat from outgoing condensate and is raised in temperature to substantially the boiling point. Generally, the amount of condensate available for heating is somewhat less than the amount of sea water to be heated, and furthermore not all of the excess enthalpy in the condensate can be recaptured. For these reasons an additional heater 14 may be used if desired to raise the temperature of the sea water a few additional degrees in its passage through line 16 from the heat exchanger 13 to the atmospheric evaporators 17a—17c. When heater 14 is not used, passage of the heated water is through bypass line 15.

In the first of the atmospheric evaporators 17a (FIG. 2) there are a plurality of first stage evaporating chambers 18a into which the preheated sea water is passed. In evaporation chambers 18a, as will be described more fully hereinbelow, a portion of the water in the brine is evaporated, producing steam which is withdrawn through line 19a and brine concentrate which is withdrawn through line 21a. The steam is compressed by compressor 22a to a relatively small pressure increment above the atmospheric pressure to which it was generated. The compression is substantially adiabatic and the steam is thus raised to a higher temperature than the temperature at which it was generated, both because the saturation temperature for the steam is higher at the higher pressure and because a small amount of superheat is imparted to the steam. The compressed steam is passed to desuperheater 23a in which a small amount of water is injected into the steam to remove its superheat and to bring it to the condensation temperature at its slightly elevated pressure.

The desuperheated steam is passed into first stage heating chambers 24a which are separated from the evaporating chambers by heat transfer walls 26a. The pressured steam condenses in heating chambers 24a, thereby losing heat content which passes through the heat transfer walls 26a and supplies the heat to evaporate the brine in the evaporator chambers. The condensate produced in the heat exchangers passes out of the chambers through line 27a and to return line 28.

The brine concentrate passing out of the evaporating chambers 18a is split into a recycle portion which passes through line 29a and is blended with the preheated sea water feed and a product portion which passes through line 31a to the second stage atmospheric evaporator 17b. The proportion of recycling concentrate to product concentrate may vary considerably, as for example, from about zero to about 20 parts of recycle concentrate per part of product concentrate and preferably about seven to 15 parts of recycle concentrate per part of product concentrate.

A second stage atmospheric evaporator 17b operates in a manner similar to first stage atmospheric evaporator 17a with evaporating chambers 18b, steam lines 19b, condensate lines 21b, compressor 22b, desuperheater 23b, heating chambers 24b, heat transfer walls 26b, condensate lines 27b, recycle lines 29b, and condensate product lines 31b being comparable to the similar elements in the first atmospheric evaporator 17b.

FIG. 2 shows three atmospheric evaporators, the last being 17c (with its component chambers, lines, walls, pump and compressor being designated on the drawing similarly to the comparable parts of the evaporator 17a, except with the subscript c). In an actual embodiment it is preferred to use at least four stages of atmospheric evaporation and up to about 20 to 30 stages. In the last stage a sodium chloride recycle stream, from a source hereinafter specified, is blended with the brine concentrate feed. The condensate from atmospheric evaporator 17c passes through line 27c to condensate manifold 28 and thence through heat exchange 13 as hereinbefore stated. After losing its heat in the heat exchanger the condensate is passed through line 32 to condensate storage.

The product concentrate which is passed out of the last atmospheric evaporator through line 31c preferably has had at least 70 percent of its water removed and most preferably from about 72 to about 76 percent removed. At this concentration, under the conditions of the invention, there is a considerable amount of precipitated salt in suspension in the brine, almost enough to thicken the brine to the point where wall film flow thereof cannot be maintained.

FIGS. 3 and 4 show a single atmospheric evaporator, such as the first stage evaporator 17a and shows its general structure. FIG. 3 shows a set of four evaporating chambers 18a and a set of three heating chambers 24a. It is preferred that at least six each of heating and evaporating chambers be supplied for the first atmospheric evaporator 17a with the number decreasing for subsequent evaporators as the volume of liquid decreases.

In the atmospheric evaporator the heated sea water in line 16 is distributed to the several feeder lines 33a to distributors 34a situated above heating chambers 24a and separated therefrom by barriers 36a. The sea water passing into the distributors 34a spills over the serrated edges 37a at the top of walls 38a which are upward extensions of heat transfer walls 26a. As the sea water spills over the serrated edge, it forms a film 35a on the wall extension 38a which flows downwardly over the wall extension and over the heat transfer wall therebelow. The upward extensions 38a are of sufficient height to assure the desired downward velocity of the flowing film by the time it passes the level of barriers 36a and flows onto the heat transfer wall 26a. The height necessary to achieve the desired theoretical velocity may be calculated from the well-known formula $$v = \sqrt{v_o^2 - 2as,}$$

wherein $v$ is the desired velocity, $v_o$ is the initial velocity, $a$ is the acceleration due to gravity (32 feet per second) and $s$ is the vertical height. Since $v_o$ is usually zero, it may be seen that the minimum desired theoretical velocity of 14 feet per second requires that the height of the extension be at least about 3 feet. Preferably, the extension is about 5 feet high, producing a theoretical velocity of about 18 feet per second. Of course, the actual velocities achieved are short of these theoretical velocities; but the actual velocities are very difficult to ascertain with any great degree of accuracy and can vary, depending upon the viscosity of the distilland, etc. Hence, these theoretical velocities are presented here merely as an approximation of comparison of what the actual velocities may be for different height wall extensions. However, it is to be understood that regardless of the precise velocities actually achieved, such 3 and 5 foot wall extensions have proven to be generally satisfactory in the present invention.

In FIG. 3 the total height is designated as the dimension L and the height of the upward extension is designated as the dimension L'.

As the film of sea water progresses down the heat transfer wall 26a, it increases its downward velocity. It is preferred that the total height of heat transfer wall 26a and its upward extension 38a be at least 16 feet so that the theoretical velocity at the bottom of the heat transfer wall shall be a least 32 feet per second. Preferably, the total height is between about 20 and about 24 feet. The flowing film becomes thinner as it flows down the heat transfer wall both because of its increased velocity and because of the evaporation of a portion of the water therein. The film thickness at the top of the heat transfer wall is generally in the range of about 0.01 to about 0.1 inches in thickness.

The flowing film picks up heat from the heat transfer wall and a portion of the water therein is evaporated. During a single pass over the heat transfer wall a relatively minor proportion of the water content (of the order of about 5 to about 20 percent, preferably about 10 percent) is evaporated. The amount of evaporation in a single pass is limited in order to avoid a substantial change in the boiling point of the brine in any one stage. The brine, being more concentrated at the bottom of the heat transfer wall, has a somewhat higher boiling point than at the top. For this reason, it is preferred to concentrate the brine in at least four stages of atmospheric evaporation, and possibly as many as 20 to 30 stages.

The heat transfer walls are generally flat plates for simplicity of construction. 16-gage aluminum sheet may be used.

The distance between the heat transfer walls is dependent upon the rate of evaporation of the liquid. From sea water about 3 to about 10 pounds of water per hour are evaporated per square foot of heat transfer wall. At such rate of evaporation, the heat transfer walls are generally about 2 to 3 inches apart.

The vapors produced by evaporation of water from the brine flow are passed out of the evaporation chambers through lines 39a which lead to line 19a. The stream is passed to compressor 22a which adiabatically compresses it to a pressure increment of about 1 to 5 p.s.i., thereby raising its temperature by about 10° F. to about 50° F. The temperature increment includes a superheat increment of about 7° F. to about 35° F. which is removed in desuperheater 23a by the injection of a small amount of water, usually less than about 1 percent of the weight of the superheated steam. The desuperheated steam at a temperature between about 3° F. and 15° F. higher than its highest temperature of generation at the bottom of the evaporating chamber is then passed into the heating chambers 24a through headers 41a containing openings 40a. As the saturated steam loses heat to the heat transfer walls 26a, it condenses on the walls and flows downwardly as a film on each wall. In order to avoid buildup of the condensate films to a thickness which would impede heat transfer therethrough, collectors 42a are provided at spaced vertical locations on the walls. It is usually desired that the thickness of the condensate film be limited to not more than about 0.005 inches. Spacing of the condensate collectors at a vertical displacement from each other of no more than about 4 feet, and preferably no more than about 2 feet, achieves this result.

The condensate collectors 42a slope downwardly, as shown in FIG. 4 toward the downcomer lines 43a which connect with line 27a and thence to condensate line 28.

Although the temperature differential between heating chamber and the evaporating chamber is quite low, excellent heat transfer is achieved by a combination of several factors, including the limitation of the thickness of the condensate film, the high velocity of the brine film and the avoidance of fouling on the evaporating side of the heat transfer wall by the low-temperature differential and by the fast moving brine film.

The concentrated liquor is removed from the evaporating chambers through lines 44a which lead to line 21a which in turn leads to recycle line 29a and to line 31a which feeds the concentrate to the next set of atmospheric evaporators. The brine is passed through the desired number of stages with the precipitated salts carried in suspension by the high liquid velocity. The concentration of precipitated salts rises with the evaporation of water from the brine until the brine concentrate approaches a viscosity beyond which it cannot be maintained as a flowing film. For sea water containing about 2.38 percent of sodium chloride, 0.31 percent of magnesium chloride, and 0.11 percent of calcium sulfate, the brine is concentrated until about 70 to 76 wt. percent of the water has been removed.

At this concentration most of the sodium chloride is still in solution but a substantial amount of calcium sulfate is precipitated.

The brine concentrate leaving the last of the atmospheric evaporators through line 31c is preferably passed through filter 46 prior to being introduced into the first flash chamber 47a. Alternatively, the filer may be bypassed by line 48. Calcium sulfate is removed from filter 46 and is passed to slurry mix tank 51, as shown schematically by lie 49.

In flash tank 47a a moderate vacuum is applied to the brine concentrate to cool it by lowering its boiling point. The cooling in flash chamber 47a is substantially adiabatic. Constant stirring is maintained in flash chamber 47a by means of stirrer 49a. The brine concentrate from the first flash chamber is removed through line 52a and passed to the second flash chamber 47b. Generally, a vacuum of the order of about 15 inches of mercury is applied in the first vacuum flash chamber. The number of vacuum flash chambers may vary suitably from about two to about four with three being shown in FIG. 1. In the last vacuum flash chamber 47c a reduced pressure of about 20 to 24 inches of mercury is maintained so that the temperature therein is of the order of about 140° to about 160° F. The additional water evaporated from the flash chambers is passed out through lines 53a, 53b, and 53c to header 54 from which it may be combined with other steam generated in the process or may be utilized for heating purposes in the process.

In the flashing chambers the total temperature drop is about 100° F. (from about 250° F. in the last atmospheric evaporating chamber to about 150° F. in the last flash chamber) making about 100 B.t.u. per pound of concentrate available for additional evaporation. This amount of heat will evaporate about 10 percent of the remaining water in the concentrate passing to the flash chambers.

The brine slurry from the last flash chamber 47c is passed through line 52 c to filter 56 from which the calcium sulfate cake is withdrawn to slurry mix tank 51 as shown schematically by line 57 while the filtered concentrate passes through line 58 to the evaporative crystallizer 59. At this point, about 80 to 85 percent of the weight of the original sea water has been removed so that the filtered concentrate is about 15 to 20 percent thereof.

This first cut of separating the suspended crystallized salts from the saturated solution removes the major quantity of the calcium sulfate with an attendant very small proportion of the total sodium chloride. This relationship of solubility and resultant precipitation as water or solvent is removed is shown on FIG. 19.

Washing the precipitated slats on the filer and recycling the wash water reclaims a substantial portion of the amount of sodium chloride that is precipitated with the calcium sulfate. This method produces a substantially pure calcium sulfate and returns most of the sodium chloride to be recycled finally emerging as product.

Continuous high-velocity motion of the slurry is used all during the process from the last atmospheric evaporator through the flash tanks and complete filtration to eliminate the possibility of stoppage of pipe lines or buildup of salt crystals in tank bottoms.

Throughout the process, the amount of precipitation is controlled so that the viscosity of the slurry carrying the precipitate is not higher than about 150 centipoise under operating conditions. At the same time, the velocity of the slurry is maintained at a high level, preferably in excess of about 8 feet per second, by the use of relatively high pumping pressure and the use of small transfer pipes.

It has been found that the combination of high velocity and limited viscosity at these levels avoids stoppage of the pipe lines.

The precipitated salt in the slurry mix tank from filters 46 and 56 is stirred with condensate water introduced through line 61. The salt is reslurried and passed through line 62 to filter 63 from which calcium sulfate is taken off as indicated by line 64. Filter 63, as well as filters 46 and 56 described above, are preferably continuous rotary filters, such as Oliver filters, with a doctor blade continuous removing the filter cake.

Hot wash water introduced through line 66 selectively redissolves the sodium chloride from the filter cake while precipitating calcium sulfate from the liquor on the cake. The filtrate from filter 63 is recycled to the atmospheric evaporation step, and particularly to the last evaporating chamber 18c through line 67, as shown in FIGS. 1 and 2. The amount of sodium chloride in the recycle stream recovered from filter 63 is generally between about 10 and about 30 percent of the original sodium chloride content of the sea water.

In the first evaporative crystallizer 59 the pressure is reduced to about 2.6 inches of mercury absolute and a temperature of about 130° F. is maintained. Additional evaporation takes place and small crystals of sodium chloride, called "seed crystals" are formed in the filtrate. The slurry of seed crystals is passed through line 68 to a second evaporative crystallizer 69 in which a pressure of about 3 inches of mercury absolute and a temperature of about 145° F. are maintained and in which the seed crystals grow while additional evaporation takes place. The slurry then passes through line 71 to the third evaporative crystallizer 72 which serves as a cooling crystallizer in which crystal size is built up to about 24 mesh.

In the cooling crystallizer a pressure of about 2 inches of mercury absolute and a temperature of about 130° F. are maintained. The first and second evaporative crystallizers are heated, as is well known in the art, by continuous withdrawal of a portion of the contents, passage through heat exchangers (not shown) and recycle.

At this point, as shown by the solubility curve of FIG. 19, the major portion of the sodium chloride has been crystallized and precipitated with a very small amount of calcium sulfate and essentially zero percent of magnesium chloride. The separation is purposely made at a concentration which leaves a mother liquor or bitterns containing about 10 percent of the total sodium chloride still in solution together with 100 percent of the magnesium chloride. Control of the amount of water evaporated up to this cut permits control of the purity of the product sodium chloride. A partial recycle of the bitterns can be used to reclaim some of the sodium chloride if economically warranted.

To summarize, control of the ratio of salts precipitated and removed at each step combined with (1) washing the filtrate to increase purity of the product and (b) recycling the wash liquors and mother liquors will produce products of the purity required.

The concentrated slurry from the cooling crystallizer is passed through line 73 to centrifugal separator 74, in which the precipitated sodium chloride is separated from the concentrated liquor which contains sodium chloride and magnesium chloride. The solids recovered on the centrifugal separator are washed with hot water (about 180° F.) introduced through line 75, and the crystals are reduced in size from about 24 mesh to about 30 mesh. The washing removes substantially all of the calcium sulfate from the sodium chloride product. Removal is not effected by dissolution of the calcium sulfate, but rather by physical transport in the wash water since the calcium sulfate is flocculent while the sodium chloride is relatively dense.

The washed crystals comprising substantially pure sodium chloride are passed to sodium chloride storage as shown schematically by line 76. The concentrated liquid, called "bitterns" is passed through line 77 with a portion being recycled through line 78 to the first evaporative crystallizer. Generally, the proportion of bitterns recycled is between about 25 percent and about 75 percent of the total bitterns removed from the centrifugal separator. The portion of bitterns which is not recycled (about 5 percent by weight of original sea water) may be subjected to treatment to recover magnesium salts and other materials therefrom, as is well known in the art, or may be discarded.

The overall process is quite economical with respect to heat input requirements. While the boiling of 100 pounds of water by direct heat input requires about 100,000 B.t.u. the method of this invention requires compression power equivalent to only about 5,000 B.t.u. for the same amount of evaporation. The power requirements of the pumping operations are relatively low, of the order of about 10 B.t.u. per 100 pounds of water evaporated.

While the invention has been described above with particular reference to the recovery of sodium chloride from sea water, it is to be understood that it is generally applicable to the recovery of either solvent or solute in any solution of a solid in a liquid. The invention is useful in the evaporation of brines other than sea water for recovery of either the salt or the water therein, or both. The invention is useful in the evaporation of saline solutions of low sodium chloride content, such s brackish waters, or in the evaporation of saline solutions of high sodium chloride content, such as the waters of salt lakes or inland seas.

FIGS. 5 through 15 illustrate an evaporating unit 100 of a second embodiment of the present invention, especially adapted for the recovery of solvent. As indicated previously, the embodiment illustrated by this unit 100 has been found to be especially effective in evaporating sea water in the initial stages of the overall evaporating process illustrated in FIGS. 1 and 2, during which stages roughly about half of the water is evaporated. Thus, for example, this unit 100 can well be utilized as the evaporator indicated at 17a in FIG. 2. Since the operation of the units 17a, b and c have been described previously herein, it is believed that the operation of the apparatus shown in FIGS. 5 through 15 will be readily understood by now describing the construction of the same and indicating only generally the function of its component parts.

This evaporating unit 100 can be seen to have a general boxlike configuration and thus comprises front and rear vertical walls 102 and 104, respectively, and two vertical sidewalls 106. These walls 102, 104 and 106 are closed by top and bottom covers 108 and 110, respectively, to form a substantially closed, boxlike structure. Extending longitudinally between the front and rear walls 102 and 104 are fixedly secured thereto, are a plurality (six in the specific apparatus shown herein) of vertical heat exchange walls 112, these walls being disposed in general parallel relationship with one another and with the sidewalls 106. The top and bottom edges 114 and 116, respectively, of each of the walls 112 terminate a moderate distance (e.g., about a half foot) short of, respectively, the top and bottom cover plates 108 and 110, so that there is provided in the unit 100 an upper chamber 118 for the infeed apparatus for the distilland which is to be passed down the heat exchange walls 112, and a lower collecting chamber 120 to collect the distilland as it drops from the heat exchange walls 112.

Alternate adjacent pairs of the heat exchange walls 112 are provided with top and bottom horizontal closure plates 122 and 124, respectively, so that these alternate pairs of heat exchange walls 112, with their related plates 122 and 124 and with the portions of the front and rear walls 102 and 104 located therebetween, define closed chambers 126 which function as vapor condensing chambers. The spaces between the remaining pairs of heat exchange walls 112 are open both top and bottom, and thus define chambers 128 which are in free communication with the aforementioned upper distilland intake chamber 118 and the lower distilland collecting chamber 120. These chambers 128 function as evaporating chambers and are located alternately between the condensing chambers 126. Also, each of the two side walls 106 defines, with its adjacent heat exchange wall 112, a related one of the evaporating chambers 128.

Extending a short distance upwardly (e.g., about two inches) from the top edge 114 of each heat exchange wall 112 is a related one of several flange members 130. Alternate pairs of these flange members 130, with the related plate 122 extending therebetween, define a related one of several distilland distributing troughs 132 (see FIGS. 10 and 11), each of which is located in the upper distilland intake chamber 118 immediately above a related condensing chamber 126. To distribute distilland to each of these troughs 132, there is provided at the upper rear end of the unit 100 a distilland intake manifold 134 which receives the distilland through a single intake pipe 136 and feeds the distilland into several intake openings 138, each of which is provided at the rear end of a respective one of each of the troughs 132. Each trough 132 has a section of screen 140 located therein to dissipate any turbulence in the distilland flowing from the opening 138 into the troughs 132. This is conveniently accomplished by arranging each section of screen 140 in a roll of one or more layers, the diameter of the roll of screen being approximately the same as the width of its trough 140, and with the roll of screen 140 lying lengthwise in its related trough 132. The distilland flows in through the intake manifold and through the openings 138 into the several troughs 132, from which the distilland falls in a film down the evaporating surface 142 of each of the heat exchange walls 112. (The evaporating surface 142 is, of course, that wall surface facing its related evaporating chamber 128.) The distilland which falls from the bottom edge 116 of each wall 112 is collected in the lower chamber 120 and passes out a pipe 144 to be further processed in the manner indicated previously herein.

The vapor which evaporates from the falling films of distilland in the evaporating chambers 128, is withdrawn from the chambers 128 by means of a vapor collecting manifold 146 (see FIGS. 6, 9 and 15) located at the lower front portion of the evaporating unit 100. This manifold 146 has a general boxlike structure; its width is the same as that of the evaporating unit 100; and its height in the particular apparatus shown herein is about one-third to one-quarter that of the entire evaporating unit 100. So that the manifold 146 can communicate properly with the evaporating chambers 128, those portions of the front wall 102 which lie within the manifold 146 and are adjacent the evaporating chambers 128 are entirely cut away to form vapor outlet openings 148 of a relatively large cross-sectional area. Thus, vapor passes from the chambers 128 through these openings 148 into the manifold 146; and the vapors pass from the manifold 146 through an outlet conduit 150 to a compressor (not shown in FIGS. 5 through 15).

As indicated previously in the general description of the process of the present invention, these vapors are compressed substantially adiabatically, then desuperheated by the addition of water, and then passed into the condensing chambers, which in the present embodiment are designated 126. To feed the compressed vapors into the condensing chambers 126, there is provided at the upper front portion of the unit 100 an infeed manifold 152 (see FIGS. 5, 6 and 8) having a general boxlike configuration. The compressed vapor travels into the manifold 152 through an intake conduit 154, and passes from the manifold 152 into the uppermost portion of the condensing chambers 126 through openings 156 formed in those portions of the front wall 102 which are within the manifold 152 and adjacent the condensing chambers 126.

As previously described herein, the compressed vapors condense in the chambers 126 on the heat exchange wall surfaces 158 (i.e., condensing surfaces) which face the condensing chambers 126.

As previously described herein, the compressed vapors condense in the chambers 126 on the heat exchange wall surfaces 158 (i.e., condensing surfaces) which face the condensing chambers 126.

Condensate traps 160 (see Figures 5, 6, 12 and 14) are provided on each of the condensing surfaces 158 at vertically spaced intervals of one foot. As illustrated in FIG. 12, each condensate trap 160 comprises an upper flange portion 162 by which it is joined to its related heat exchange wall 112, and a lower trough portion 164 to collect the condensate formed on the heat exchange surface portion 158 thereabove. Each such trap 160 has a moderate rearward slope so that the condensate collected therein flows to the rear of each condensing chamber 126 and falls to the bottom of the condensate chambers 126. A manifold 166 is provided at the lower most end of the condensing chambers 126 to collect the condensate from the lower ends of the changers 126. This manifold 166 has an outlet pipe 166a and a pressure relief valve, indicated at 166b.

To provide lateral support for the several heat exchange walls 112, there are located in each condensing chamber 126 a plurality of bracing plates 168. Each of these bracing plates 168 is conveniently attached to its two adjacent heat exchange walls 112 by forming the two edge portions of each plate 168 as downturned lips 170 which engage the upturned edge of the related condensate trough 164 (see FIG. 12). Most of the area of each plate 168 is formed as through openings 172 so that the steam can pass freely down through the condensing chambers 126. Brackets 174 are secured to the top of the unit 100 so that support from an overhead location can be provided for the unit 100.

While the mode of operation of this unit 100 should be readily apparent from this detailed description of the same, when read in light of the previous description of the overall process of the present invention, it is believed the following comments will be of further aid in understanding the merits of the present invention.

With regard to the vapor-collecting manifold 146, the cross-sectional area of the openings 148 should be sufficiently large so that the vapor does not have a very high velocity as it leaves the vaporizing chambers 128. Otherwise the vapor will become contaminated with droplets of the brine. Experimental results indicate that if the velocity of the vapor through the openings 148 does not exceed roughly about two feet per second, relatively pure vapor can be collected. If it is desired to so build the apparatus to extend the heat transfer walls laterally, in order to keep this vapor velocity within the desired limits, the manifold 146 can be extended upwardly; and a second vapor-collecting manifold can be provided at the rear of the unit 100.

In the apparatus disclosed in the first embodiment of the present invention, provision was made for imparting an initial downward velocity of the falling film of brine as it comes into contact with the heat transfer surface. As indicated previously, this becomes especially critical when handling brine of higher salt concentrations. However, with lower salt concentrations, it is possible to pass the falling film onto the heat transfer walls with a very low initial velocity and thus utilize substantially all of the wall area for heat transfer.

To examine experimentally the heat transfer characteristics of the heat transfer walls as used in the present invention, a single heat transfer wall was erected. It was 15 feet in height and was made of 18-gage aluminum sheeting. On the condensing side of the sheet, seven collecting gutters were provided at 2-foot intervals. Each side of the wall was enclosed with a respective boxlike structure so as to form an evaporating chamber and a condensing chamber, generally similar to those shown previously herein. Relatively pure water (i.e., tap water, which has essentially the same heat transfer characteristics as sea water which has not been concentrated to an appreciable extent) was raised to 212° F. and passed down the evaporating side of the wall with the pressure in the evaporating chamber being atmospheric. Saturated steam having a pressure of about 1 pound per square inch gage was fed into the condensing chamber. Vapor was removed from the evaporating chamber, and condensate was collected from each gutter separately by means of a plurality of hoses (each leading from a related gutter) so that the heat transfer characteristics could be determined for each wall portion between a related pair of proximate gutters. A number of runs were made in which the flow rate of water and the temperature differential between the condensing chamber and the evaporating chamber were each varied independently. The results of these runs were tabulated and are summarized in the accompanying graph of FIG. 16.

In the graph of FIG. 16, curve A is a plot of the overall heat transfer coefficient for the entire heat transfer wall (measured in terms of B.t.u.'s per square foot per hour per degree Fahrenheit temperature differential) when the temperature differential is varied and the flow of water is maintained at a substantially constant flow of 11.2 gallons per minute for each lateral foot of the heat transfer wall. Curve B is a plot of the overall heat transfer coefficient for the entire heat transfer wall when the temperature differential was held substantially constant at 3° F. and the flow of water down the heat transfer wall was varied. In general, it can be seen that the overall heat transfer coefficient was relatively high for temperature differentials between 2° and 4° F., and also relatively high for flows which varied between 7.5 and 11.5 gallons per minute per lateral foot of wall. Further, it was found that the heat transfer coefficient for each wall section between each adjacent pair of gutters was high. Experimental results other than those used to draw the graph of FIG. 16 indicate that heat transfer coefficients yet higher than those indicated in the graph of FIG. 16 can be attained in practicing the present invention.

Figure 17:
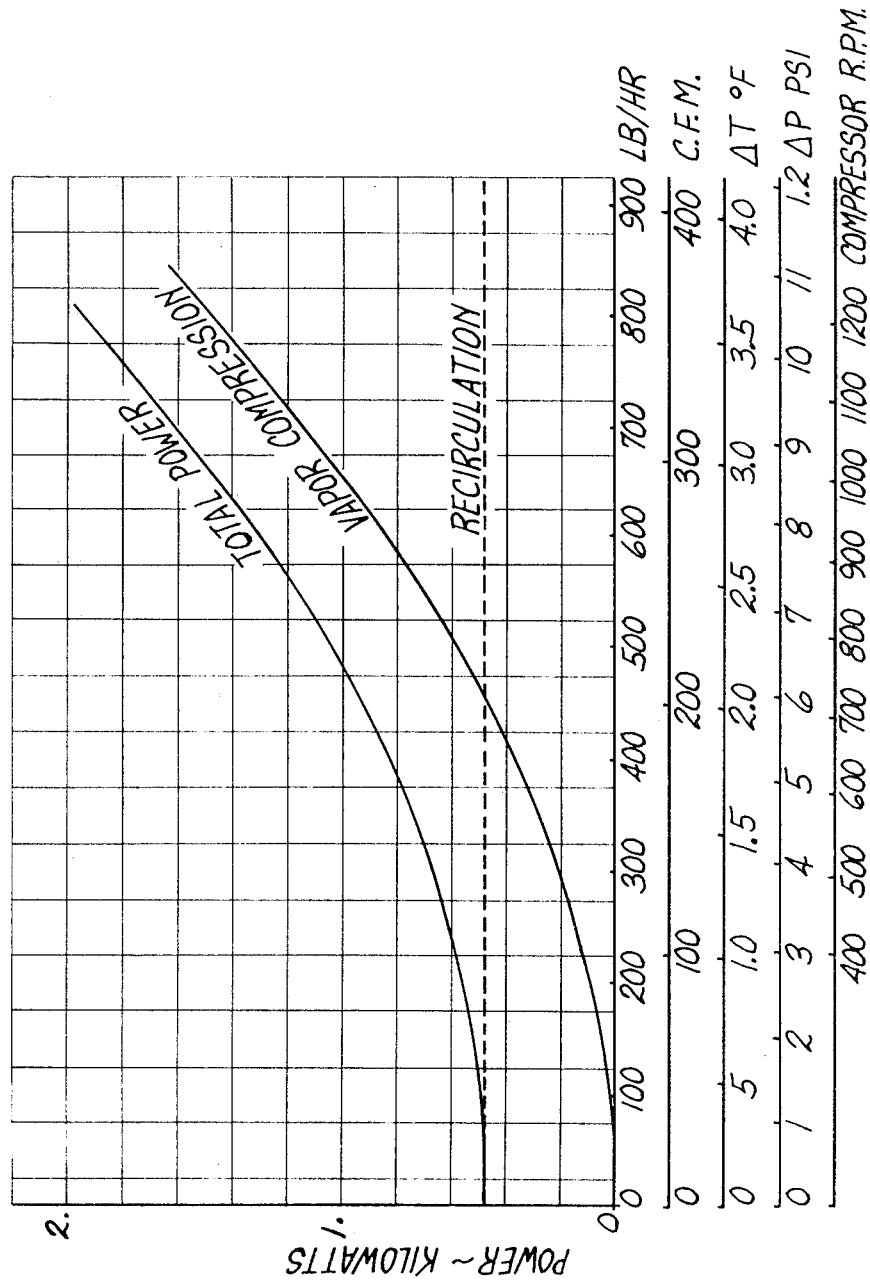
FIG. 17 is a second graph illustrating various performance characteristics of a specific embodiment of the invention.

To examine further the operating characteristics of the present invention, an evaporating unit was constructed substantially identical to that shown in FIGS. 5 through 15. The heat transfer walls 112 were fabricated of 18-gage aluminum sheeting; these were made 15 ⅔ feet long and 2½ feet wide, and were spaced 3 inches from one another. The unit was operated in the manner described previously herein, using fresh water as the distilland. Based on data taken during the operation of this unit, the graph of FIG. 17 was prepared to show the operating characteristics of the unit. In the graph, the pounds per hour indicated is the amount of water condensed from the unit; the "C.F.M." indicates the cubic feet of vapor per minute evaporated from the unit; "ΔT° F." indicates the temperature differential in degrees Fahrenheit, and "ΔP p.s.i." indicates the pressure differential in pounds per square inch between the condensing and evaporating chambers. From this data, it is believed that those skilled in the art will be able to select the operating conditions best suited for a particular operation (e.g., in terms of desired output, overall economy in view of power costs, etc.) For example, in an area where power is inexpensive relative to the costs of installing the apparatus, it would be better to operate at the upper end of the curves. On the other hand, if opposite conditions prevail, it would be better to operate at the lower end of the curves.

It is to be understood, of course, that if a unit such as this were to be made for a large commercial operation, the number of heat transfer walls would be increased; and quite possibly the lateral dimension of the heat transfer walls would be increased. The number of stages used would depend on various things, such as whether or not it is desired to recover salt from the brine, etc.

Figure 18:
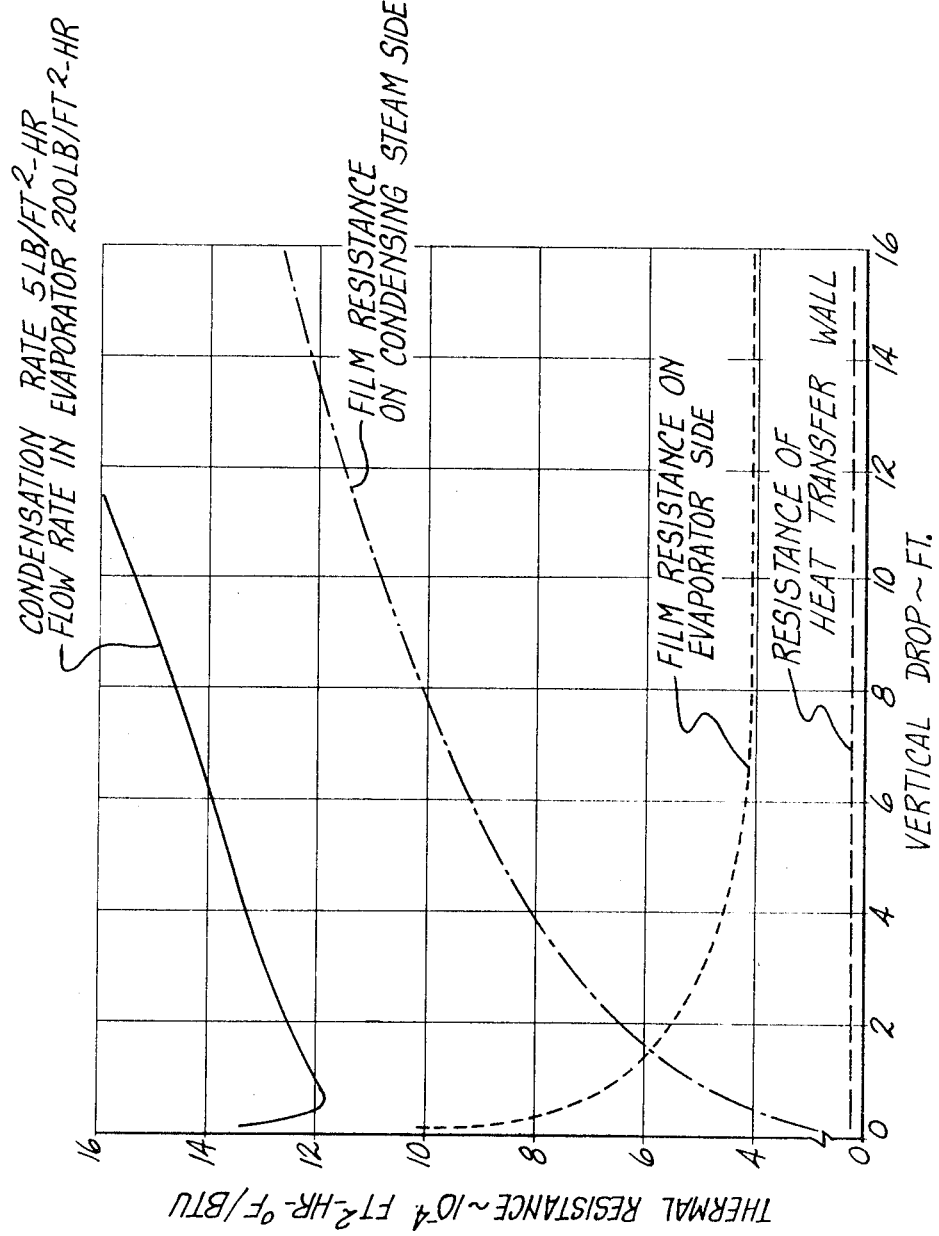
FIG. 18 is a third graph illustrating certain localized heat transfer characteristics across a heat transfer wall.

In the unit shown in FIG. 5 through 15, the condensate collecting gutters were spaced vertically 1 foot apart. As indicated previously, this arrangement of vertically spaced gutters is considered to be especially significant in the present invention in obtaining a proper heat transfer balance. Perhaps this can be best understood with reference to FIG. 18, wherein is shown the heat transfer characteristics at specific locations over a 16-foot vertical wall where there is a free falling film on one side of the heat transfer wall, and steam condenses on the opposite side of the wall with no provision for gutters or other means to remove the condensate at vertically spaced intervals. Thus the condensate which collects on the upper wall portions falls to the lower wall portions.

There is a first curve of the heat transfer resistance caused by the free-falling film on the evaporating side of the heat transfer wall. This resistance is highest at the top of the wall and decreases downwardly until it becomes substantially constant over about the lower half of the wall. There is a second curve of the resistance on the condensing side of the wall; and from this curve it is apparent that as condensate collects and flows to the lower wall portions to increase the condensate film thickness over the lower wall portions, the resistance on the condensing surface at the lower wall portions increases until it is quite disproportionate to that on the evaporating side of the wall. There is a third plot which is the heat transfer resistance of the aluminum wall. This resistance is relatively small an is constant over the entire wall, and hence appears as a straight line at the lower portion of the graph. The fourth curve (i.e., the uppermost curve) represents the total resistance.

In the present invention, by providing gutters at properly spaced intervals of 1 or 2 feet, the heat transfer resistance on the condensate surface is not permitted to become disproportionate to the heat resistance on the opposite wall surface. For example, if the gutters are spaced at 2-foot intervals, the heat transfer resistance of the condensate film that occurs within the first 2 feet of the wall would be essentially the same for each 2-foot vertical interval for the entire wall. Obviously, if the gutters were spaced at 2-foot intervals, the resistance of the condensate film would be lower yet for the entire wall surface. Within these limits, it becomes a matter of design requirements as to how close to make the spacing of the gutters in accordance with the desired performance of the unit. However, when the spacing of the gutters becomes greater than about four feet, it can be seen that the heat transfer resistance of the condensate film is becoming quite disproportionate so as to destroy the balance of heat transfer coefficients on each side of the wall and thus impair the proper operation of the unit.

It is also to be understood that numerous modifications of the process and apparatus described above may be made within the scope of the invention. For example, the desired downward velocity of the flowing film on the heat transfer surface need not be achieved by an upward extension of the heat transfer wall but can be achieved instead by forming the film from a stream which has a downward velocity imparted to it by a pump. When the film has an initial downward velocity it is especially preferable to have a flat heat transfer wall since liquid entering a tubular channel at high velocity forms eddy currents which erode and eventually cut through the tube.

The condensate film may be controlled in thickness by means other than the collection troughs described above, as for example, by weirs spaced from the wall by the desired distance.

It is also to be understood that the number of atmospheric evaporators, of flashing tanks and evaporative crystallizers and the dimensions thereof may be varied within the general teachings of this invention.

I claim:

1. A method of evaporating a liquid containing a dissolved solid which comprises evaporating a portion of said liquid at atmospheric pressure and at its atmospheric boiling point to precipitate a substantial amount of dissolved solid therefrom and to leave said liquid saturated with respect to said dissolved solid, transferring said saturated liquid at its atmospheric boiling point to a reduced pressure flashing zone as the sole liquid feed thereto and evaporating additional liquid in said flashing zone substantially adiabatically while precipitating additional dissolved solid therefrom.

2. The method of claim 1 wherein said liquid containing a dissolved solid is an aqueous saline solution and wherein said evaporation at reduced pressure takes place at a temperature between about 60° C. and about 80° C. and precipitates said dissolved solid from said solution.

3. The method of claim 1 wherein said liquid containing a dissolved solid is a brine containing dissolved sodium chloride and calcium sulfate, wherein said atmospheric pressure evaporation precipitates a substantial amount of calcium sulfate therefrom and said reduced pressure evaporation precipitates additional calcium sulfate therefrom.

4. The method of claim 3 wherein said atmospheric evaporation step evaporates at least 70 percent of the water in said brine.

5. The method of claim 3 wherein calcium sulfate is separated from residual liquid after said reduced pressure evaporating step and wherein said residual liquid is separately processed to recover sodium chloride therefrom.

6. The method of claim 3 wherein said evaporation in said atmospheric evaporation step takes place at a final temperature of about 250° F.

7. The method of claim 1 wherein said liquid containing a dissolved solid is a brine containing dissolved sodium chloride and calcium sulfate, wherein said atmospheric pressure evaporation is carried out while said brine is moved as a downflowing film on a heat transfer wall at a downward velocity of at least about 14 feet per second to precipitate a substantial amount of calcium sulfate therefrom.

8. The method of claim 7 wherein said brine passes downwardly as a flowing film over each of a series of at least four heat transfer walls.

9. The method of claim 7 wherein steam is removed during said atmospheric pressure evaporation, said steam is compressed by a pressure increment of about 1—6 p.s.i. to impart superheat thereto, said compressed steam is desuperheated while maintaining substantially all of said pressure increment, said desuperheated, compressed steam is passed into contact with the opposite side of said heat transfer wall, wherein at least a portion of said steam is condensed as a downflowing film on said opposite side of said heat transfer wall and wherein at least a portion of the liquid condensate in said last named film is collected at vertically spaced locations in its downward path.

10. In a method of evaporating a liquid containing a dissolved solid wherein a portion of said liquid is evaporated in at least one evaporation zone to precipitate a substantial amount of dissolved solid therefrom and therein said liquid, concentrated and saturated and as a slurry containing said precipitated solid, is transferred through a transfer line to a separation zone to separate precipitated solid therefrom, the improvement which comprises limiting the amount of precipitation in said evaporation zone so that the viscosity of the slurry obtained is not higher than about 150 centipoises and maintaining the velocity of said slurry in said transfer line at at least about 8 feet per second, said liquid being evaporated in at least two successive evaporation zones before passing to said separation zone and wherein the precipitation in the first of said evaporation zones is limited so that the viscosity of the slurry obtained is not higher than about 150 centipoises and the velocity in said transfer line to said second evaporation zone is maintained at least 8 feet per second, said first evaporation zone being maintained at atmospheric pressure and said second evaporation zone being maintained at reduced pressure.

PO-1050
(5/69)

UNITED STATES PATENT OFFICE
CERTIFICATE OF CORRECTION

Patent No. 3,586,090          Dated June 22, 1971

Inventor(s)      George L. Henderson

It is certified that error appears in the above-identified patent and that said Letters Patent are hereby corrected as shown below:

Column 1, line 20, "bee" should read -- been --. Column 3, line 26, insert semicolon after "invention". Column 5, line 24, "per second" should read -- per second per second --. Column 6, line 57, "filer" should read -- filter --; line 59 "lie" should read -- line --. Column 7, line 25, "filer" should read -- filter --. Column 8, line 22, "(b)" should read -- (2) --. Column 11, line 16, "of" should read -- to --. Column 12, line 30, "FIG." should read -- FIGS. --; line 69, "2-foot" should read -- 1-foot --. Column 14, line 32, "therein" should read -- wherein --.

Signed and sealed this 21st day of December 1971.

(SEAL)
Attest:

EDWARD M. FLETCHER, JR.      ROBERT GOTTSCHALK
Attesting Officer              Acting Commissioner of Patents